April 25, 1939. C. W. BRISTOL 2,155,817
CLAMPING DEVICE FOR CHARTS FOR RECORDING INSTRUMENTS
Filed Dec. 1, 1937
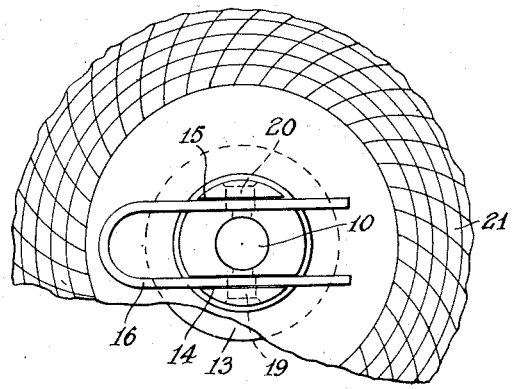
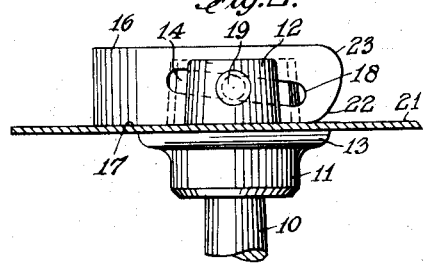
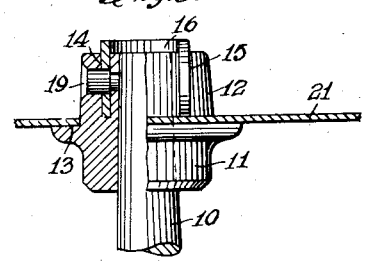
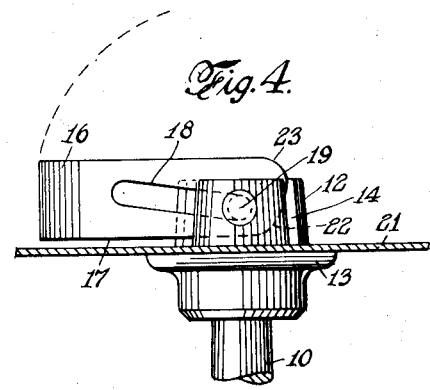
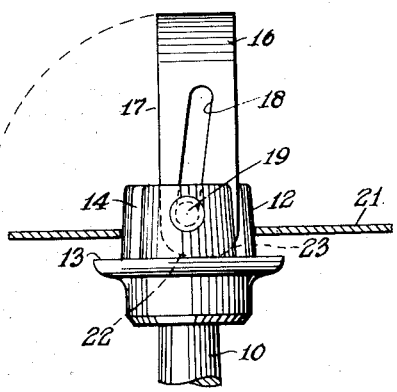
INVENTOR.
CARLTON W. BRISTOL
BY
ATTORNEY.

Patented Apr. 25, 1939

2,155,817

UNITED STATES PATENT OFFICE 2,155,817

CLAMPING DEVICE FOR CHARTS FOR RECORDING INSTRUMENTS

Carlton W. Bristol, Naugatuck, Conn., assignor to The Bristol Company, Waterbury, Conn., a corporation of Connecticut Application December 1, 1937, Serial No. 177,466

4 Claims. (Cl. 234—75)

The invention relates to recording instruments, and more especially to a device for clamping upon the spindle of the timing element of such an instrument the record sheets used in providing circular charts of measured magnitudes.

In instruments of this class, the usual method of attaching the chart to the spindle is by means of a threaded nut or the like engaging a corresponding threaded portion on the spindle, projecting through a central opening in the chart, and providing thereby a clamping action whereby the chart may be held in place. The shortcomings of this method are well known to users of such instruments, and include the possibility of loss of the nut, which of course must be removed to permit placing the chart, the possibility of crossing threads between the nut and the spindle, and the difficulty of tightening the nut without angularly displacing the chart from its desired relation to the spindle.

Various other expedients have been proposed for this purpose; but in general they have either introduced more difficulties than they have eliminated, or they have been of an intricate nature, involving manufacturing costs out of proportion to the permissible cost of an instrument of this class.

It is an object of the present invention to provide a chart clamping device having a unit construction with no parts to become separated from the structure of the recording instrument.

A further object lies in the provision of a device of this nature which can be quickly and easily manipulated without risk of angular displacement of the chart.

A further object lies in the provision of a device of this nature in which the paper chart is constrained to lie flat in relation to its mounting arbor.

A still further object lies in the provision of such a device, which may be fabricated and assembled at a low cost, and which shall be efficient and durable in extended service. In carrying out the invention, the rotatable arbor of the measuring instrument timing element is provided with a flange to receive the chart and against the upper surface of which the said chart is to be held by the novel clamping device smoothly pressing the same thereto. To this end, the arbor has an upwardly extending axially disposed portion which is provided with two parallel grooves designed to receive the corresponding parallel sides of a U-shaped clamping member pivoted to the said portion through pivot members passing through respective inclined or cam slots in the said sides of the U-shaped member, the lower edges of the said sides lying in a common plane to which the slots are inclined. The U-shaped member has a translatory movement toward the axis of the arbor thereby to clamp a chart to its flange and also is rotative about the pivotal connection to place said member in a position parallel to the said axis for allowing of removal and replacement of a chart.

The nature of the invention, however, will best be understood when described in connection with the accompanying drawing, in which:

Figs. 1 and 2 represent respectively a plan view and a side elevation, while Fig. 3 is an end elevation, partly in vertical section, of a chart clamping device embodying the principles of the invention, and including a portion of chart clamped therein.

Fig. 4 is a side view of the device in a partly released position.

Fig. 5 is a side view of the device fully released, and in a position where a chart may be placed upon or removed from the spindle or arbor.

Referring to the drawing, 10 indicates the spindle of a recording instrument, adapted to be rotated about its axis by a clock mechanism (not shown) at a constant rate of speed, and having mounted thereon, as by a taper fit, a hub or arbor element 11 with a projecting axially located truncated conical portion 12 and a radially disposed plane portion 13 adapted to form a flat flange or platen to receive the chart.

Formed in the projecting portion 12 are two parallel vertical grooves 14 and 15, symmetrically displaced from the axis of the arbor and adapted to provide guideways for the parallel sides of a U-shaped clamping member 16, having parallel straight side portions with lower edges 17 lying in a common plane, and having formed in said side portions slots 18 inclined at a small angle to said edges. Diametrically disposed in the portion 12 of the hub 11 are pin or pivot members 19 and 20 passing through the slots 18 and providing bearings whereupon the clamping member 16 may have motion in two senses—rotative about an axis perpendicular to the main axis of the spindle 10, and translatory in a sense perpendicular to both said axes and departing from parallelism with the plane portion 13 by an angle corresponding to the angular displacement of the slots 18 from the plane in which lie the edges 17.

The over-all dimensions of the clamping member 16 are made such that when rotated to extend in a direction parallel with the axis of the arbor, the member 16 will pass freely through the central opening of a chart adapted to fit over the portion 12 of the arbor. The angle between the slots 18 and the plane in which lie the edge portions 17 is such that when the clamping member 16 is placed with said edges perpendicular to the axis of the arbor and slidably moved transverse to the pins 19 and 20, the reaction of the inclined edges of the slots 18 and said pins will effect a wedging action between the member 16 and the plane portion 13, and that this wedging action, as distributed between the two parallel edges, gives the equivalent of a substantial surface contact with the plane portion 13 and provides ample clamping action for positively driving a chart 21 placed between said clamping member and said plane portion of the arbor. The applicant is aware that efforts have been made to utilize for a similar purpose a wedging member providing a single line contact intersecting the axis of rotation of the arbor; but this has been shown to have a tendency to crimp the paper, which tendency is further accentuated by the admitted need for a groove in the flat surface of the arbor in order that there may be developed sufficient driving torque.

One angle of each of the straight portions of the clamping member 16 is relieved by a curved portion, as at 22, permitting rotation of the clamping member about the axis of the pins 19 and 20 in its unclamped position, without fouling the chart. The opposite angle of each of the straight portions is extended, as at 23, preventing complete rotation of the member 16, and limiting its angular deflection to a position perpendicular to the plane surface 13 when completely unclamped, as shown in Fig. 5, thereby facilitating removal or replacement of charts without obstruction by the clamping member.

Thus there has been provided an efficient means of clamping a circular chart in place, without the need for resilient springs or other auxiliary retaining means, and at the same time constraining the paper to dispose itself in a substantially flat and smooth conformation.

I claim:

1. In a chart-clamping device: an arbor having a flange to receive a chart, a clamping member mounted on the arbor and having two parallel clamping portions radially displaced from the axis of said arbor and provided with similar inclined and elongated slots, pivot means transverse the axis of said arbor and engaging said slots whereby said member may be swung about said pivot means and slidably translated for wedging action with the flange of said arbor to retain a chart thereto.

2. In a device for retaining a circular chart on a recording instrument: an arbor having a plane surface against which said chart may be smoothly pressed, an element embodying two displaced parallel wedge members mounted on the arbor and adapted for wedging relation with said surface, together with pivot means adapted to engage said members for wedging action in one position of the same and for swinging action in another position of the same.

3. In a device for retaining a circular chart on a recording instrument: a circular arbor having a plane surface against which said chart may be smoothly pressed and a projecting portion adapted to pass through a central opening in said chart, and having two parallel grooves radially displaced from the center line of said arbor, a clamping member having two parallel portions lying in said grooves, said portions having clamping surfaces lying in a common plane and also having elongated slots inclined to said plane, together with pivot means transverse the axis of said arbor and engaging said slots whereby said clamping member may be swung about said pivot means and slidably translated for wedging said chart against said plane surface.

4. In a device for retaining a circular chart on a recording instrument: a circular arbor having a plane surface against which said chart may be smoothly pressed and a projecting portion adapted to pass through a central opening in said chart, a clamping member mounted on said portion and having parallel portions radially displaced from the center line of said arbor and clamping surfaces lying in a common plane and also slots inclined to said plane, pivot means transverse the axis of said arbor and engaging said slots, whereby said clamping member may be extended axially of said arbor for passing through the opening in said chart, and swung through an angle about said pivot means and translated in a sense longitudinal to said slots for wedging said chart against said plane surface.

CARLTON W. BRISTOL.